Sept. 13, 1949.  G. F. NADEAU  2,481,770
ANTIHALATION PHOTOGRAPHIC FILMS

Filed Feb. 1, 1949

GALE F. NADEAU
INVENTOR

BY Daniel I. Mayne
F. M. Emerson Holmes
ATTORNEYS

Patented Sept. 13, 1949

2,481,770

UNITED STATES PATENT OFFICE 2,481,770

ANTIHALATION PHOTOGRAPHIC FILM

Gale F. Nadeau, Rochester, N. Y., assignor to Eastman Kodak Company, Rochester, N. Y., a corporation of New Jersey Application February 1, 1949, Serial No. 73,964

4 Claims. (Cl. 95—9)

This application is a continuation in part of my application Serial Number 654,757, filed March 15, 1946, now abandoned.

This invention relates to antihalation films.

It is the object of the present invention to provide an antihalation film without the use of a dye layer on the back of the film or to increase the antihalation effect when used along with such a dye layer.

Since the use of the usual dye type antihalation layers involves numerous manufacturing difficulties particularly when uniform high density layers are needed, one of the main objects and advantages of the present invention is the elimination of the need for such high density layers. It is an object of preferred embodiments of the invention to provide this unique type of antihalation film in a form easy to manufacture and with good keeping qualities.

According to the present invention an antihalation photographic film is made up of the sensitive emulsion layer on a plurality of transparent supporting layers, at least one of which is a low index layer, having an index of refraction at least 0.08 less than that of the emulsion layer. The low index layer must be within 0.005 inch of the emulsion layer in order to have a useful degree of antihalation effect and must in general be more than 0.00005 inch thick in order to avoid optical interference effects. When the solvent in the subbing is relatively active, it "cuts into" the support and reduces the sharpness of the interface; coatings only 0.00002 inch are often satisfactory under these circumstances. In all cases however, the thickness must be greater than that at which these interference effects appear.

This antihalation arrangement is particularly useful when combined with an ordinary antihalation dye layer on the back of the film, which antihalation dye layer has an optical density measured at normal incidence less than 0.2. Not only are such low density layers easier to manufacture uniformly, but they can be used in color processes which require exposure through the base.

The invention consists essentially of a low index sublayer between the emulsion and the support. The important effect takes place at the interface between the low index sub and the layer in front of the sub which is in general the emulsion layer but may be another thin sublayer whose index is approximately equal to or greater than that of the emulsion. As long as the low index sublayer is within 0.005 inch of the emulsion layer, any such intermediate layers have little, if any, effect on the invention and can be considered as part of the emulsion layer itself. Similarly, additional layers, with index approximating that of the support, between the low index layer and the support may be considered part of the support.

The index "break" at the critical interface must be at least 0.08 to give a useful effect and is preferably as high as possible. In fact, the invention is enhanced when an emulsion layer having an unusually high index is used, although the choice of emulsions is usually dictated by other considerations.

Practically all ordinary gelatin photographic emulsions have refractive indices equal to that of the gelatin alone (1.541). The presence of the dispersed silver salts does not influence the refractive index of the system; the only materials which do alter the index are the plasticizers, soluble salts and dyes, if any. In any case the effect is a small one (the maximum index apparently being less than 1.56) and all standard emulsions can be considered as having an index of about 1.54. Specifically cine negative panchromatic emulsions have this index and it is with cine film that halation is most important.

The support materials are usually cellulose esters and regardless of which ester is chosen or the kind and quantity of plasticizer, the index of refraction is between 1.480 and 1.505. Cellulose nitrate (1.498) is also in this range although cellulose ethyl ether (1.474) falls slightly below the range. The index of refraction of the support does not affect the present invention, except possibly for second order effects not considered here, and except for the fact that the invention would not be needed if the support itself had a very low index of refraction in which case the support would provide the essential interface.

Also first order theory predicts practically no advantage in introducing a second subbing with high index between the low index layer and the emulsion unless one of several incidental things happen. First the index change at the boundary of the emulsion and high index layer may be gradual, more gradual than that at the high index, low index interface. Or second some high index substance might wander during manufacturing into the emulsion layer raising its index. Or third, the high index layer may act to prevent low index material wandering into the emulsion layer as it might otherwise do. These three possibilities are mentioned as explanations of the improved effect obtained when a high index second subbing is included. This improved effect is second order and not as great as the main effect which the theory given below does account for.

In all embodiments of the invention the low index subbing should have as low an index as is obtainable compatible with other requirements of the sub. The preferred embodiment of the invention employs a low index supporting layer or subbing which contains more than 30% by weight of a fluorine compound such as a fluoride salt. The higher the percentage of fluorine compound, the lower the index of refraction and hence the greater the antihalation effect. However, fluoride salts or other fluorine compounds must be carried in a suitable vehicle, compatible both with the film support and with the emulsion layer and stable, at least mechanically stable, under the action of the various processing solutions to which the photographic layer will be subject after exposure. Thus the fluorine compound should be carried in a transparent vehicle having a low water permeability, sufficiently low to prevent wandering of the fluorine compound into adjacent layers during the manufacture of the film.

A theory of the invention and its preferred embodiments will be fully understood from the following description when read in connection with the accompanying drawings in which.

Figure 1:
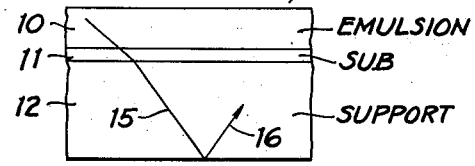
Fig. 1 illustrates the optical phenomenon, halation.
Figure 2:
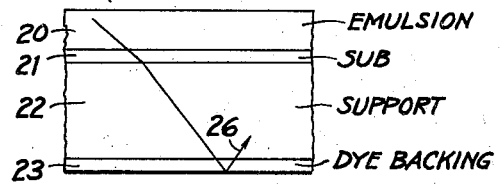
Fig. 2 shows the reduction of this halation by prior antihalation coatings.

In Fig. 1 a translucent emulsion layer 10 is coated on a support made up of a transparent subbing layer 11 and a transparent flexible film 12. Light diffused by the emulsion as indicated by the ray 15 is reflected by Fresnel reflection from the back of the support 12 and as indicated by the ray 16 is directed toward the emulsion, fogging it at some distance from the point of the original image point from which the ray 15 came. This causes the well-known halation or spreading of the light in photographic films. Fig. 2 shows one prior method of reducing this halation. The emulsion layer 20 coated on subbing 21 and support 22 forms a film which is provided with a dye layer 23 having an optical density which reduces the intensity of the light reflected from the rear surface of the film. This reduced intensity ray is indicated by the arrow 26. The halation causing light must travel twice through the dye layer 23 and travels through greater thicknesses thereof when it strikes this layer at greater obliquity. Thus the dye layer is quite efficient in reducing halation since the more oblique rays are the source of the more objectionable halation. However, it is not easy to coat high density halation layers since they must of course be removed (usually by washing out of the dye) during the processing of the film so as not to interfere with subsequent printing operations. Also certain films must be exposed through the base and the speed of the film would be greatly reduced by a high density antihalation layer coated on the back of the support.

Figure 3:
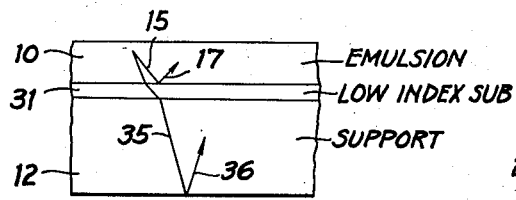
Figs. 3 to 8 are cross sections greatly enlarged of antihalation films incorporating various embodiments of the invention.

According to one embodiment of the invention shown in Fig. 3, the emulsion layer 10 is coated on a low index subbing 31 having a low index of refraction at least 0.08 less than that of the emulsion layer 10. Due to the index break between the layer 10 and the layer 31, light scattered in the emulsion at great obliquity represented by the ray 15 is totally internally reflected in the emulsion layer 10 as indicated by the ray 17 and never gets into the support so as to travel far enough from the original image point to cause noticeable halation. Furthermore rays of less obliquity are partially internally reflected at the interface between the layer 10 and the subbing 31. That part of the scattered light which does get through as indicated by the ray 35 has greatly reduced intensity and the halation causing light indicated by the line 36 is not spread far from the original image point.

Figure 4:
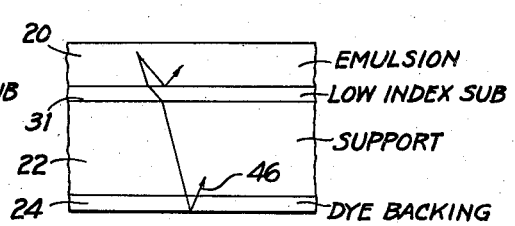

In Fig. 4 this embodiment of the invention is combined with an antihalation layer. The emulsion layer 20 is coated on a low index subbing layer 31 and a support 22 having an antihalation layer 24 which still further reduces the halation producing light as indicated by the short line 46. The layer 24 may be identical with prior art dye layer 23 or preferably, since the present invention reduces the need for a dye layer, the layer 24 is not quite as heavy as the layer 23 and is hence much easier to manufacture uniformly.

Figure 5:
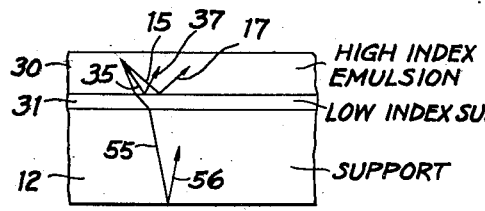
Figure 6:
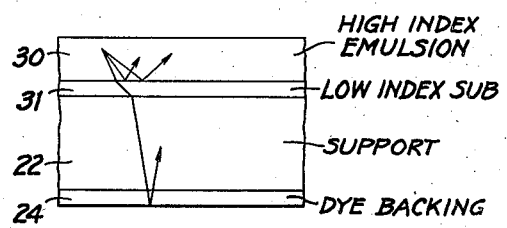

Since the index break, which must be greater than 0.08, between the emulsion layer 10 and the sublayer 31 must be as great as possible, the invention is improved whenever (for any reason) a high index emulsion is chosen as shown at 39 in Figs. 5 and 6. In this case the higher index break causes not only ray 15 to be totally reflected as 17, but also ray 35 at less obliquity to be totally reflected as ray 37. This allows only rays of very low obliquity such as ray 55 to proceed to the support and to be reflected as shown by arrow 56. Since in practice no emulsions deviate far from 1.54 index, the added effect shown by Figs. 5 and 6 is of little practical importance but it is measurable.

Figure 7:
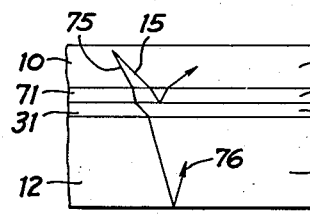
Figure 8:
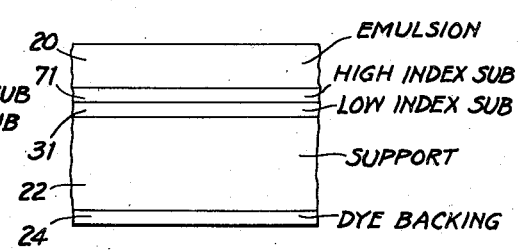

On the other hand, the embodiment shown in Figs. 7 and 8 in practice gives at least part of the effect of an emulsion layer with quite high index of refraction. These embodiments differ from Figs. 3 and 4 merely by the inclusion of a high index sub 71 between the ordinary emulsion 10 and the low index sub 31. One new interface is added which should increase Fresnel reflections and hence give some slight improvement but the effect obtained is apparently greater than this would account for. The extreme halation ray 75 should be just as oblique as the ray 35 of Fig. 3 since the gain at the interface between layers 71 and 31 should on first order theory be mostly lost by bending at the interface between layers 10 and 71. However Figs. 7 and 8 do give slightly less halation than the simple embodiment shown in Figs. 3 and 4.

By way of specific examples of the invention, the various layers have the following indices of refraction.

Emulsion 10 is any standard emulsion such as panchromatic cine negative with index 1.54; practically all photographic emulsions have this index or very close thereto.

Subbing 11 is gelatin with index 1.54; it could be cellulose nitrate or acetate with index 1.49 or any combination of these.

Support 12 is cellulose acetate with index 1.481; cellulose acetate and cellulose nitrate normally have indices between 1.480 and 1.505; any of these are operative for the present invention.

Low index sub 31 according to the present invention contains about equal amounts of sodium fluoroborate and cellulose nitrate (e. g. it is coated from 0.8% sodium fluoroborate in a 1% solution of cellulose nitrate, in a suitable solvent such as 10% methyl Cello-solve (monomethyl ether of ethylene glycol) and the balance methyl alcohol, the cellulose nitrate being one with high ethyl alcohol solubility, medium viscosity and low nitrogen content about 11%).

High index emulsion 30 of Figs. 5 and 6 is merely to show the expected effect when an emulsion of index 1.55 say is selected (some dyed emulsions have increased index of refraction) and to introduce a practical, though so far unexplained, way of getting this added effect in useful amounts as illustrated in Figs. 7 and 8.

High index sub 71 contains about equal amounts of polystyrene (index 1.55) and a chlorinated biphenyl resin containing at least 68 per cent by weight of chlorine (index 1.66). It is preferable to apply an ordinary gelatin subbing over the sub 71 before applying the emulsion, but since this third sub is gelatin it is considered part of the emulsion layer 10. It is not an optically distinct layer.

Dye backing 23 is a standard antihalation dye backing; such backings have a transmission density at normal incidence greater than 0.2.

Dye backing 24 is either identical with dye backing 23 or differs therefrom merely by being thinner or including a lower percentage of dye so that its density is less than 0.2. The present invention places no limitations on the type or form of dye backing, any prior type may be used, but the present invention does allow lower densities to be used which is often desirable.

In order to test antihalation effects quantitatively many different halation latitude criteria have been proposed. A. Kuster in Phot. Korr 71, No. 5, pp. 73–75, and No. 6, pp. 65–68, published "An objective method for the determination of halation" which is quite satisfactory for this purpose. Kuster used arbitrary step numbers for comparison of halation factors, but density differences or differences in the logarithm of the exposure are for many purposes even better, using the same optical system of course. With these systems, the halation factors are merely relative and the particular factors given below are intended only for comparison one with the other.

Various fluorine compounds such as fluorine salts of lithium, sodium, potassium, magnesium, rubidium, and ammonium, or mixed salts such as cryolite, cryolithiolite, fluosilicates, and fluoborates may be used. All of these are fluoride salts having low indices of refraction. I have found of course that the higher the percentage of fluoride salt which I am able to dissolve in a vehicle such as cellulose nitrate or cellulose acetate or cellulose ether, the more is the effect in reducing halation. A carrier containing about 50% by weight of a fluoride salt appears to be quite satisfactory; there should be at least 30% of the fluoride by weight. For example 0.8% sodium fluoroborate in a 1% solution of cellulose nitrate, in a suitable solvent such as 10% methyl Cello-solve and the balance methyl alcohol forms a satisfactory coating solution, the cellulose nitrate being one with high ethyl alcohol solubility, medium viscosity and low nitrogen content about 11%. Such nitrates are known to be suitable for subbing. The index of refraction of the layer is about 1.4 or less.

The halation latitude specifically gained by any particular subbing appears to depend on the vehicle in which the fluoride salt is coated and on the particular fluoride salt used, but in any case useful effects are always obtained unless the fluoride salt wanders into the emulsion layer which of course is just a side issue as far as the present invention is concerned and can easily be overcome by proper choice of salt or a vehicle free from wandering difficulties and compatible with the emulsion.

A given film with no dye and with no antihalation subbing according to the present invention has a halation latitude of 1.15 when tested as described above, the factor being on a more or less arbitrary scale measuring log of exposure range. An ordinary antihalation backing increases this latitude to about 2.0 or even to 2.25 but this requires a high optical density in the dye layer which is difficult to coat uniformly and which is objectionable for certain purposes to which the film is put. Any increase in the halation latitude is of course desirable but an increase to about 1.35 or 1.5 is necessary if the effect is to be worthwhile from a practical point of view. Obviously if one were able to get such an increase in halation latitude without any dye layer, only a relatively low density dye layer would be required to bring the halation latitude all the way up to 2.0. In fact the two systems for reducing halation appear to combine more than simply additively, in that a low index subbing which alone increases the latitude from 1.15 to 1.35 combined with a dye layer which alone gives a similar increase in latitude results in a total effect greater than the sum of these two increases. Specifically the sodium fluoroborate in cellulose nitrate in a ratio of 8:10 by weight as described above has resulted in an increase of halation latitude from 1.15 to 1.56. This is an exceptionally useful effect either alone as in Fig. 3 or combined with a dye layer. This same low index subbing layer when combined with a dye backing as in Fig. 4 which dye layer had a density of only .07 gave a halation latitude of 1.65 and when a dye layer of density .099 was used the value went up to 1.74. The gain is rapid and a dye layer 0.11 raises the latitude to 1.81; thus very adequate and useful results are obtained with dye layer densities much less than 0.2. The main difficulties with prior dye backings arose only when high concentrations of dye greater than .2 density were used.

In the present invention, the low index layer must be a transparent (i. e. not appreciably diffusing) layer. Therefore the fluorine compound must stay in solution in its vehicle; of the above listed fluorine compounds, those such as cryolite which are difficult to dissolve are therefore the more difficult to use in this invention. (Even if a slightly diffusing layer were devised which gave a useful reduction of halation and which became transparent during processing of the film, the presence of such a diffusing layer would cause or hide defects which would not disappear in the processing.) This requirement for transparency serves to distinguish over an interesting discovery of E. E. Jelley disclosed in copending application Serial No. 658,513 filed March 30, 1946. Jelley shows that finely divided dispersions affect the index of refraction even though they are not down to molecular dimensions.

Another example of a low index sub 31 is 1% $MgSiF_6$ and either 1% cellulose acetate or 0.75% cellulose nitrate in a solvent (10% methyl cellusolve, 72% acetone, 18% methanol). The halation latitude is about the same as or slightly less than that gained with the sodium fluoroborate example.

As a specific example of Fig. 7, layer 31 was coated using 1% $NaBF_4$ dispersed in 1% cellulose nitrate (in the solvent just mentioned) and layer 71 consists of 1% of the chlorinated biphenyl resin mentioned previously and 1% polystyrene (coated from the same solvent). This example showed a .22 gain in halation latitude over a similar film omitting the layer 71.

Having thus described the preferred embodiments of my invention, I wish to point out that it is not limited to these specific materials but is of the scope of the appended claims.

I claim:

1. An antihalation photographic film, comprising a plurality of laminated layers including a translucent sensitive emulsion layer having a sensitive material dispersed in a vehicle and a plurality of solid transparent supporting layers at least one of which contains more than thirty per cent by weight of a low refractive index fluoride salt, has a thickness greater than that at which optical interference effects appear, is within 0.005 inch of said emulsion layer and has an index of refraction at least 0.03 less than that of said vehicle.

2. A film according to claim 1 having one of the supporting layers a light absorbing layer with an optical density measured at normal incidence less than 0.2.

3. A film according to claim 1 in which the vehicle has an index of refraction about 1.54, the supporting layers consist mainly of one relatively thick layer having an index of refraction between 1.48 and 1.505 and said at least one of the supporting layers is a subbing layer between the main supporting layer and the emulsion layer.

4. A film according to claim 1 in which said at least one of the supporting layers consists of said fluoride salt and a transparent vehicle having low water permeability, sufficiently low to prevent wandering of the fluoride salt into adjacent layers during manufacture of the film.

GALE F. NADEAU.

REFERENCES CITED

The following references are of record in the file of this patent:

UNITED STATES PATENTS

| Number | Name | Date |
| --- | --- | --- |
| 17,330 | Howell | May 19, 1857 |
| 406,460 | McNeill | July 9, 1889 |
| 676,272 | Plagwitz | June 11, 1901 |
| 778,947 | Brasseur | Jan. 3, 1905 |
| 1,484,347 | Ullman | Feb. 19, 1924 |
| 2,167,732 | Verkinderen | Aug. 1, 1939 |
| 2,239,704 | Deboer et al. | Apr. 29, 1941 |
| 2,331,716 | Nadeau et al | Oct. 12, 1943 |
| 2,376,428 | Hansell | May 22, 1945 |
| 2,391,127 | Carver | Dec. 18, 1945 |
| 2,400,365 | Murray | May 14, 1946 |
| 2,400,366 | Murray | May 14, 1946 |

FOREIGN PATENTS

| Number | Country | Date |
| --- | --- | --- |
| 269,912 | Great Britain | July 23, 1928 |